(12) United States Patent
Johnson

(10) Patent No.: US 6,533,539 B1
(45) Date of Patent: Mar. 18, 2003

(54) PRESSURIZED GAS TURBINE ENGINE

(75) Inventor: Neldon P. Johnson, American Fork, UT (US)

(73) Assignee: International Automated Systems, Inc., Salem, UT (US)

( * ) Notice: Subject to any disclaimer, the term of this patent is extended or adjusted under 35 U.S.C. 154(b) by 0 days.

(21) Appl. No.: 09/814,498

(22) Filed: Mar. 21, 2001

(51) Int. Cl.⁷ .................................................. F01D 1/18
(52) U.S. Cl. .................................................... 415/80
(58) Field of Search ............................ 415/80, 81, 82

(56) References Cited

U.S. PATENT DOCUMENTS

| | | | | |
|---|---|---|---|---|
| 824,113 A | * | 6/1906 | Groshon | 415/82 |
| 890,392 A | * | 6/1908 | Adams | 415/80 |
| 1,110,302 A | * | 9/1914 | Flatau | 415/80 X |
| 2,569,997 A | * | 10/1951 | Kollsman | 415/80 X |
| 3,026,088 A | * | 3/1962 | Green | 415/80 X |
| 4,087,974 A | | 5/1978 | Vaughan | |
| 4,100,765 A | * | 7/1978 | Kantor | 415/80 X |
| 4,201,058 A | | 5/1980 | Vaughan | |
| 4,302,683 A | * | 11/1981 | Burton | 415/80 X |
| 4,332,520 A | * | 6/1982 | House | 415/80 X |
| 4,354,801 A | * | 10/1982 | LaBaire | 415/80 |
| 4,406,127 A | | 9/1983 | Dunn | |
| 4,430,042 A | * | 2/1984 | House | 415/80 X |
| 4,433,548 A | | 2/1984 | Hallstrom, Jr. | |
| 4,448,024 A | * | 5/1984 | Molini et al. | 415/80 X |
| 4,590,766 A | | 5/1986 | Striebich | |
| 4,785,631 A | | 11/1988 | Striebich | |
| 4,883,404 A | | 11/1989 | Sherman | |
| 4,969,796 A | * | 11/1990 | Wescott et al. | 415/110 |
| 4,996,845 A | | 3/1991 | Kim | |
| 5,000,003 A | | 3/1991 | Wicks | |
| 5,176,000 A | | 1/1993 | Dauksis | |
| 5,219,270 A | * | 6/1993 | Titmas | 415/80 |
| 5,236,349 A | * | 8/1993 | Fabris | 415/80 |
| 5,271,225 A | * | 12/1993 | Adamides | 415/202 X |
| 5,525,034 A | * | 6/1996 | Hays | 415/80 |

* cited by examiner

Primary Examiner—Edward K. Look
Assistant Examiner—Kimya N McCoy
(74) Attorney, Agent, or Firm—J. David Nelson

(57) ABSTRACT

A pressurized gas turbine engine is disclosed which utilizes a new turbine design. Pressurized gas is supplied by nozzle gas ways in the turbine to gas nozzles affixed to the perimeter of the turbine. The gas nozzles may be recessed in the turbine perimeter or extend from the turbine perimeter. The gas nozzles may be equipped with gas exit cones to enhance the efficiency of the nozzles. The axis of the nozzles have an oblique angle with the direction of rotation of the turbine. Pressurized gas is supplied to the nozzle gas ways through one or more shaft gas ways in the turbine shaft, or is supplied through engine gas ports in the front wall of the turbine engine to gas supply zones which are hydraulically separated by seal rings on the front face of the turbine, each gas supply zone being hydraulically connected to one or more nozzle gas ways.

5 Claims, 12 Drawing Sheets

PRESSURIZED GAS TURBINE ENGINE

FIELD OF THE INVENTION

This invention is in the field of turbine engines and in particular in the field of pressurized gas driven turbine engines.

BACKGROUND OF THE INVENTION

The conventional design for the turbines used in turbine engines incorporates small fins on the turbine. In order for the turbine engine to be efficient, there must be extremely close tolerances are required between the expansion chamber and the turbine fins. Also, the expansion chamber and the turbine, including the fins, must be able to withstand high temperatures. These restraints on conventional turbines makes them very expensive to manufacture. This has greatly limited the use of turbine engines in many applications.

Essentially all automobiles, trucks, buses, boats, ships, trains and smaller aircraft are powered by internal combustion engines. These engines are either spark plug ignited gasoline engines or compression heat ignited diesel engines. The efficiency of these engines, in the conversion of chemical energy to mechanical energy, is only in the rage of 20 to 25 percent. The remaining 75 to 80 percent is lost as heat in the exhaust or in the liquid cooling system through a radiator.

By comparison, the conversion of chemical energy to mechanical energy in an efficient turbine engine is approximately 45 percent. Despite the substantially higher efficiency of a turbine engine, turbine engines have not found wide application, primarily due to initial cost.

Many attempts have been made to devise an apparatus to reduce the large amount of heat which is wasted by internal combustion engines. The device disclosed in U.S. Pat. No. 4,406,127 to Dunn utilizes steam generated by injecting water onto an exhaust manifold to generate steam for powering a separate steam cylinder. Similarly, the device disclosed in U.S. Pat. No. 4,433,548 to Hallstrom utilizes steam generated by injecting water onto an exhaust manifold to provide supplemental energy to each of the cylinders.

An exhaust gas steam turbine for providing supplemental power to an automobile is disclosed in U.S. Pat. No. 4,590,766 to Striebich. For this drive unit, waste heat in the exhaust gases is utilized to produce steam for powering a supplemental turbine. A similar drive unit is disclosed in another U.S. Patent to Striebich, U.S. Pat. No. 4,785,631 and incorporates a turbine rotating element with spiral blading.

U.S. Pat. No. 4,996,845 to Kim discloses a device for utilizing waste heat from an internal combustion engine to generate steam and drive a turbine which is used for a generation of power for auxiliary use in the automobile and for heating and cooling of the passenger compartment.

U.S. Pat. No. 5,000,003 to Wicks discloses an apparatus which utilizes waste heat from an internal combustion engine to power a turbine. The inventor claims that this device has the ability to increase the overall efficiency of the engine from 25 percent to approximately 40 percent.

A hybrid internal combustion/turbine engine is disclosed in U.S. Pat. No. 5,176,000 to Dauksis. For this device, an internal combustion engine is utilized to generate heat for the production of steam which is used to power a turbine. The turbine is then utilized to drive an electric generator to charge batteries which are used as a complimentary or alternate source of propulsion for a ground vehicle.

The apparent lack of commercial success for any of the foregoing inventions is probably attributable primarily to cost. The additional cost cannot be amortized, over the lifetime of the vehicle by the fuel cost savings. The result of the foregoing is that, as consumers, we have elected to live with the low efficiency and environmental problems associated with internal combustion engines. However, the extent of the effort made to attempt to deal with the efficiency and environmental problems, as manifest by the foregoing prior art, demonstrates the extent of the need for a high efficiency engine for these applications.

The high cost of turbine engines is primarily the consequence of the close tolerance required for the construction of the turbine and the turbine body and the very high cost of materials required for heat tolerance and durability required for the traditional turbines. Particularly, the turbine fins and the turbine seat in the turbine body must be machined to very close tolerance of highly durable material. Otherwise, high efficiency will not be achieved and wear and loss of efficiency will be excessive.

The device disclosed in U.S. Pat. No. 4,883,404 to Sherman provides for the passage of fluids through a turbine for use in cooling the turbine.

The present invention utilizes steam or other pressurized gas which is directed from the center of the turbine to nozzles at the perimeter of the turbine. The nozzles have a gas discharge which is oblique to the direction of rotation of the turbine.

The present invention may also be utilized with a geothermal well, with the heated water being passed directly to the nozzles where the water is flashed to steam as the water is passed through the nozzles. Conventional geothermal generator facilities require the flashing of hot water extracted from the geothermal well to steam, and the steam is then passed to the turbine. This results in a substantial loss of energy from the water in converting it to steam. The direct flashing of the hot water in the nozzles of the present invention increases the efficiency substantially. This advantage of the present invention can be used for other applications as well, to increase efficiency and decrease complexity.

An objective of the present invention is to provide a turbine for a high efficiency engine which is economical enough for automobile and other small engine applications.

A further objective of the present invention is to provide a high efficiency turbine engine which is economical enough for automobile and other small engine applications.

A further objective of the present invention is to provide a high efficiency turbine engine for which the need for close tolerance machining and the need for high cost parts and materials are greatly reduced.

A further objective of the present invention is to provide a turbine engine which can utilize fuel types other than gasoline or diesel.

A further objective of the present invention is to provide a turbine engine which does not require the burning of fossil fuel at high pressure, thereby lessening the amount of oxide type air pollutants.

A further objective of the present invention is to provide a turbine engine that can be used with electric motor driven or partially electric motor driven vehicles which utilize battery storage of energy.

A further objective of the present invention is to provide a turbine engine that provides for the direct flashing of heated water to steam gas nozzles which power the turbine.

SUMMARY OF THE INVENTION

Preferred embodiments of the turbine engine of the present invention comprise a turbine, a turbine shaft, a turbine body and turbine shaft bearings. For these embodiments the turbine has at least two gas nozzles which are hydraulically connected by nozzle gas ways to internal shaft gas ways in the turbine shaft. For these embodiments, the turbine shaft is hollow or tubular with one or more internal shaft gas ways.

The turbine is contained within the turbine chamber of the turbine body. The turbine seat is dimensioned to be proximal to the perimeter of the turbine, thereby inducing a ground effect for gas exiting the nozzles. The close tolerance between the gas exits and the turbine seat peripheral surface is the only aspect of the turbine body that requires accurate machining. Unlike a conventional turbine, the front face of the turbine does not need to closely fit the front wall of the turbine chamber. The turbine nozzles, the turbine seat peripheral surface, the shaft gas ways and the nozzle gas ways are the only components of the turbine engine that experience very high temperatures.

For preferred embodiments, to provide for inertial balance of the turbine, if there is only one gas shaft way, the internal gas shaft way is circular and annular centered in the turbine shaft, and the gas nozzles are equally spaced at nozzle locations around the perimeter of the turbine. The nozzle angle between the axis of the gas exit nozzles and the direction of rotation of the perimeter of the turbine at the nozzle locations is also uniform.

Certain preferred embodiments utilize multiple shaft gas ways with each shaft gas way linked to one or more opposing pairs or equally spaced groups of coordinated gas nozzles, thereby providing for balance of the torque applied to turbine. Each shaft gas way may be connected to an independently controlled steam flash generator or other pressurized gas source, providing for independent activation, deactivation and gas feed for each pair of gas nozzles connected to the shaft gas way. This provides for increasing and decreasing the power supplied to the turbine while maintaining the pressure and the rate of gas flow at each gas nozzle within a desired range.

The nozzle angle is oblique to the direction of rotation of the perimeter of the turbine. Lesser nozzle angles increases the ground effect but decreases the efficiency of the direct momentum transfer of the exiting gas to the turbine, while greater nozzle angles increase the direct momentum transfer while decreasing the ground effect.

Pressurized gas is routed from a gas source through a shaft gas connector to the turbine shaft gas ways. The gas passes through the turbine shaft gas ways to the shaft gas distributor which directs the gas from each of the turbine shaft gas ways to the respective connected nozzles through the nozzle gas ways.

For certain preferred embodiments, as the pressurized gas is discharged from the gas exit nozzles in a direction opposite the desired direction of rotation of the turbine, it is also discharged against the turbine seat annular peripheral surface. This produces a back force that creates the ground effect, thereby increasing the efficiency of the engine. Other embodiments do not utilize a ground effect.

Some preferred embodiments incorporate a gas exit cone on each nozzle to enhance the efficiency of the turbine engine. The gas exit cones can be recessed in the perimeter of the turbine or affixed to the perimeter of the turbine by nozzle support tubes.

For embodiments of the present invention using steam to power the turbine, steam generators have steam chambers with controlled outputs. These outputs are controlled by a control valve, which are monitored and controlled by a steam control computer. For preferred embodiments the steam generators will be flash steam generators. The flash chambers for flash steam generators will be quite small in relation to the heat source, thereby providing for a quick recovery. A pressure sensor is used by the steam control computer to monitor the steam pressure in the flash chamber. The control computer allows the pressure in the flash chamber to reach a desired pressure and maintains the pressure at that level. When the need for more steam is determined by the control computer, the control valve is opened for that flash chamber. If more steam is required, more control valves are opened, bringing more flash chambers on line. As the steam pressure in the flash chamber is depleted, the control computer determines that more water is required and increases the water flow. Other embodiments may incorporate a combination of flash generators and other types of steam generators. This can provide for a fixed amount of steam at a constant rate while leaving the flash generators for quick response to special power demands for the turbine. Other embodiments may utilize only a fixed steam system. For these embodiments, the rotation speed or the amount of power that is delivered to the turbine is still controlled by a series of valves which are controlled by the control computer. This type of steam generator may be more readily adapted to an engine used to generate electric power for battery storage for use with an electric motor driven device.

The control computer continually monitors and controls the operating parameters of the turbine engine through use of sensors, feed back controls, and output devices. Turbine speed, required torque, gas or steam pressure, turbine balance and direction of rotation of the turbine are some of the parameters that are monitored and controlled. The control computer also controls water levels, water temperature, and water flow for cooling in a steam system and air flow around the expansion chamber for pressurized gas. By controlling water flow, the control computer can maximize the efficiency of the engine.

For other preferred embodiments of the pressurized gas turbine engine, pressurized gas may be supplied through an engine gas port in the front wall of the turbine engine. A preferred embodiment of the turbine engine with the front wall of the turbine engine removed. A turbine seal ring is affixed to the front face of the turbine and provides a gas seal between the front face of the turbine and the front wall of the turbine engine, thereby creating a gas supply zone between the front face of the turbine and the front wall of the turbine engine which is bounded by the gas seal. This provides for pressurized gas to be directed from the engine gas port to the turbine gas port. For some embodiments, the turbine seal ring is not centered on the axis of the turbine. This provides for the more uniform distribution of seal oil for all points of contact between the turbine seal and the front wall of the turbine engine. The seal oil enhances the ability of the turbine seal to minimize pressurized gas leakage between the turbine seal and the front wall of the turbine engine. The seal oil is typically injected into the contact zone between the turbine seal and the turbine engine front wall through a seal oil injector port in the front wall of the turbine engine.

For some embodiments, the nozzle gas ways are machined, formed or cast in the turbine and sealed by the turbine front face plate. The nozzles are installed in a nozzle recess in the turbine perimeter. The nozzle recesses provide for the tip of each of the nozzles to be inside the turbine perimeter, thereby providing for streamlining the turbine perimeter and allowing for a closer tolerance between the turbine perimeter and the turbine seat peripheral surface.

The turbine engine may have a turbine seat peripheral surface with transverse serrations which increase the ground effect experienced by the turbine as pressurized gas is discharged through the nozzles. A spent gas evacuator may be attached to the turbine or the turbine may have an evacuator spindle extending from the rear face with the spent gas evacuator anchored to the evacuator spindle. The transverse serrations typically will extend also to the gas expansion area of the turbine seat which is proximal to the perimeter of the spent gas evacuator. For these embodiments, the rear face of the spent gas evacuator is proximal to the turbine engine rear wall. The expansion chamber is occupied by the spent gas evacuator and the spent gas is directed to a spent gas evacuation channel for discharge through a spent gas port.

A nozzle or one or more opposing pairs or equally spaced groups of coordinated nozzles may be connected to separate pressurized gas sources through the use of multiple turbine gas seals and turbine gas ports which direct the pressurized gas received through respective engine gas ports in the front wall of the turbine engine and respective gas supply zones between the front face of the turbine and the front wall of the turbine engine, to respective nozzle gas ways and thus to the respective nozzle or pairs or groups of coordinated nozzles. Another embodiment which provides for two separate gas sources to be utilized with pairs or groups of coordinated nozzles utilizes a central internal shaft gas way to transmit gas from one pressurized gas source through interconnected nozzle gas ways to a first group of coordinated nozzles, and utilizes the annular space between the shaft gas way and the inside surface of the shaft tube of the turbine shaft as a second shaft gas way to transmit gas from a second pressurized gas source through other interconnected nozzle gas ways to a second group of coordinated nozzles.

The present invention can also be used with simplified, high efficiency systems by providing for the direct flashing of hot water to steam in the nozzles. This has use for a number of applications such a geothermal wells. This avoids the high energy losses which occur as hot water is flashed to steam and the steam is used to power the turbine.

DETAILED DESCRIPTION

Figure 1:
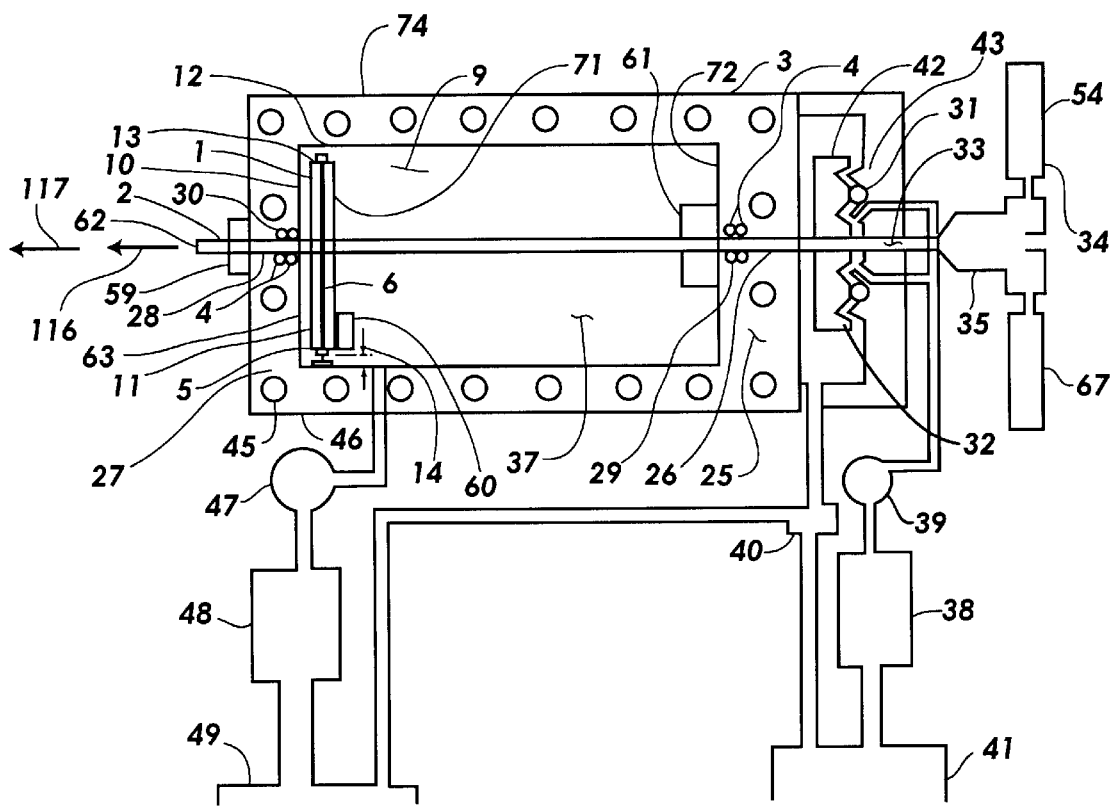
FIG. 1 is a longitudinal schematic of an embodiment of a turbine engine of the present invention, including a horizontal cross-section of an embodiment of a turbine engine body, and including a connected steam generator system.
Figure 2:
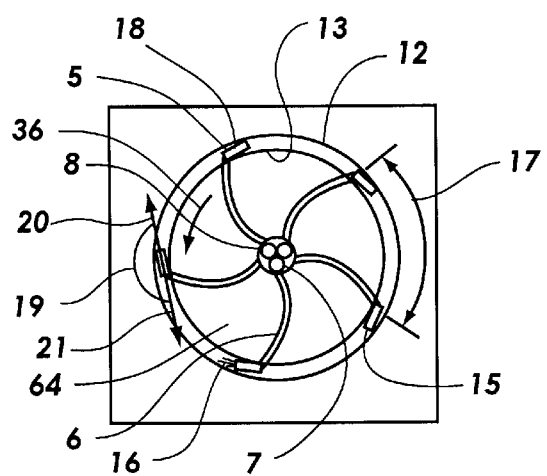
FIG. 2 is a rear cross section view showing the rear face of the turbine, the gas nozzles, and the nozzle gas ways of an embodiment of the present invention.

Referring first to FIG. 1, some preferred embodiments of the pressurized gas turbine engine 74 of the present invention are comprised of a turbine 1, a turbine shaft 2, a turbine body 3 and turbine shaft bearings 4. Referring also to FIG. 2, for these embodiments the turbine has at least two gas nozzles 5 which are hydraulically connected by nozzle gas ways 6 to internal shaft gas ways 8 in the turbine shaft. A shaft gas distributor 7 is used for these preferred embodiments to connect the nozzle gas ways to the shaft gas ways. The turbine shaft is hollow or tubular with one or more internal shaft gas ways. The turbine axis 116 is alined with the turbine shaft axis 117.

The turbine is contained within the turbine chamber 9 of the turbine body. The front wall 10 of the turbine chamber has a turbine seat 63 which is dimensioned to conform roughly to the front face 11 of the turbine. The turbine seat peripheral surface 12 of the turbine seat is dimensioned to be proximal to the perimeter 13 of the turbine and thereby has a close tolerance 14 with the gas exits 15 of the nozzles, thereby inducing a ground effect for gas 16 exiting the nozzles. The close tolerance between the gas exits and the turbine seat peripheral surface is the only aspect of the turbine body that requires accurate machining. Unlike a conventional turbine, the front face of the turbine does not need to closely fit the front wall of the turbine chamber. The turbine nozzles, the turbine seat peripheral surface, the shaft gas ways and the nozzle gas ways are the only components of the turbine engine that experience very high temperatures.

The gas nozzles are typically of a uniform design and are inexpensive to manufacture. Certain embodiments use standard nozzles which are shelf items. The turbine itself can be made of very inexpensive metals. Referring also to FIG. 2, the turbine seat 63 is merely a cylindrically shaped cavity 64 machined or formed into the front wall of the turbine chamber. Alternative embodiments provide an expansion chamber which is cylindrical with a uniform diameter which is equal to the diameter of the turbine seat annular peripheral surface.

For preferred embodiments, to provide for inertial balance of the turbine, if there is only one gas shaft way, the internal gas shaft way is circular and annular centered in the turbine shaft, and the gas nozzles are equally spaced 17 at nozzle locations 18 around the perimeter of the turbine. The nozzle angle 19 between the axis 20 of the gas exit nozzles and the direction of rotation 21 of the perimeter of the turbine at the nozzle locations is also uniform. Other means for obtaining inertial balance of the turbine will be obvious to persons skilled in the art, thereby allowing variations in the cross section of the turbine shaft and in the locations and nozzle angles of the gas exit nozzles.

Figure 3:
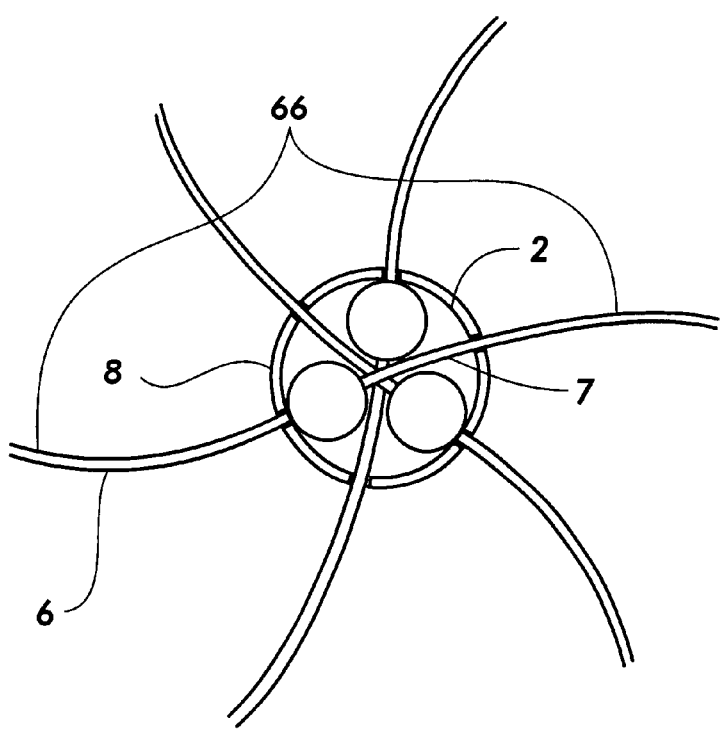
FIG. 3 is a rear view cross-section detail of a shaft gas distributor of an embodiment of the present invention.

Certain preferred embodiments utilize multiple shaft gas ways 8 as shown in FIG. 3. Each shaft gas way is linked to one or more opposing pairs 66 of gas nozzles, thereby providing for balance of the torque applied to turbine. Each shaft gas way may be connected to an independently controlled steam flash generator 67 or other pressurized gas source, providing for independent activation, deactivation and gas feed for each pair of gas nozzles connected to the shaft gas way. This provides for increasing and decreasing the power supplied to the turbine while maintaining the pressure and the rate of gas flow at each gas nozzle within a desired range.

Figure 4:
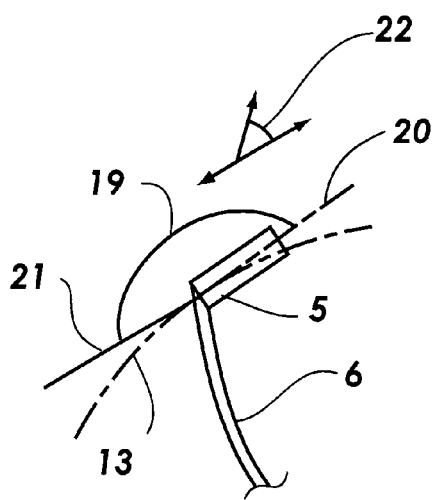
FIG. 4 is a detail of a nozzle gas way and gas nozzle arrangement of an embodiment of the present invention.

Referring now to FIG. 4, the nozzle angle 19 is oblique to the direction of rotation 21 of the perimeter of the turbine. A nozzle angle in a range 22 between 135° and 180° is believed by the inventor to be preferred. Lesser nozzle angles in this range increases the ground effect but decreases the efficiency of the direct momentum transfer of the exiting gas to the turbine, while greater nozzle angles increase the direct momentum transfer while decreasing the ground effect.

Referring again to FIG. 1, the turbine shaft passes through the first end wall 25 by a first shaft way 26 and through the second end wall 27 by a second shaft way 28. Structural support and free rotation of the turbine shaft is provided in the first shaft way by a first shaft bearing installation 29 and through the second shaft way by second shaft bearing installation 30. Preferred embodiments also incorporate a main bearing and bearing retainer assembly 32. An oil seal 31 is incorporated in the main bearing and bearing retainer assembly to prevent pressure leakage. In order to prevent the pressurized gas from escaping through the main bearing and bearing retainer assembly, cooled oil is pumped by a seal oil pump 39 from a seal oil reservoir 38 to the oil seal. The viscosity and back pressure of the oil minimize leakage of the pressurized gas.

Pressurized gas 33 is routed from a gas source 34 through a shaft gas connector 35 to the turbine shaft gas ways. The gas passes through the turbine shaft gas ways to the shaft gas distributor 7 which directs the gas from each of the turbine shaft gas ways to the respective connected nozzles through the nozzle gas ways.

Figure 5:
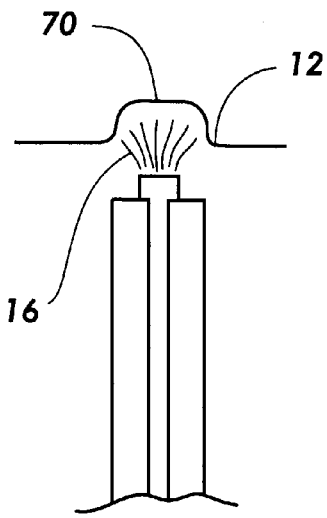
FIG. 5 is a detail of a turbine seat peripheral surface nozzle groove.

Referring now to FIG. 2, the pressurized gas is directed from the turbine nozzles, imparting a rotational force 36 on the turbine. Also, because of the proximity of the annular peripheral surface to the gas exit nozzles and because of the nozzle angle, a ground effect is experienced as the gas is released from the gas exit nozzles. This further increases the efficiency of the energy transfer from the pressurized gas to the turbine. Referring also to FIG. 5, the annular peripheral surface may have a nozzle groove 70 which is proximal to the perimeter of the turbine to enhance the ground effect.

Spent gas is cooled in an expansion chamber 37 which is the space between the rear face 71 of the turbine and the rear wall 72 of the turbine body. In the case of steam, as the gas is cooled, it is condensed into water. Oil from the oil seal pressure system and the condensed water are separated by an oil separator 40. The oil is then cooled by an oil cooler assembly 41. As the turbine and the turbine shaft rotate, the front element 42 of the main bearing assembly rotates with the turbine shaft, but the rear element 43 of the main bearing assembly is attached to the turbine body and does not rotate.

For certain preferred embodiments, as the pressurized gas is discharged from the gas exit nozzles in a direction opposite the desired direction of rotation of the turbine, it is also discharged against the turbine seat annular peripheral surface. This produces a back force that creates the ground affect, thereby increasing the efficiency of the engine.

As pressurized gas is allowed to expand in the expansion chamber. This cooling process is enhanced by cooled liquid being circulated through cooling tubes 45 in the walls 46 of the turbine body. The cooled steam is condensed into water by pumping the steam by means of the steam pump 47 through the radiator 48. The cooled water is then pumped into the reservoir 49.

Figure 6:
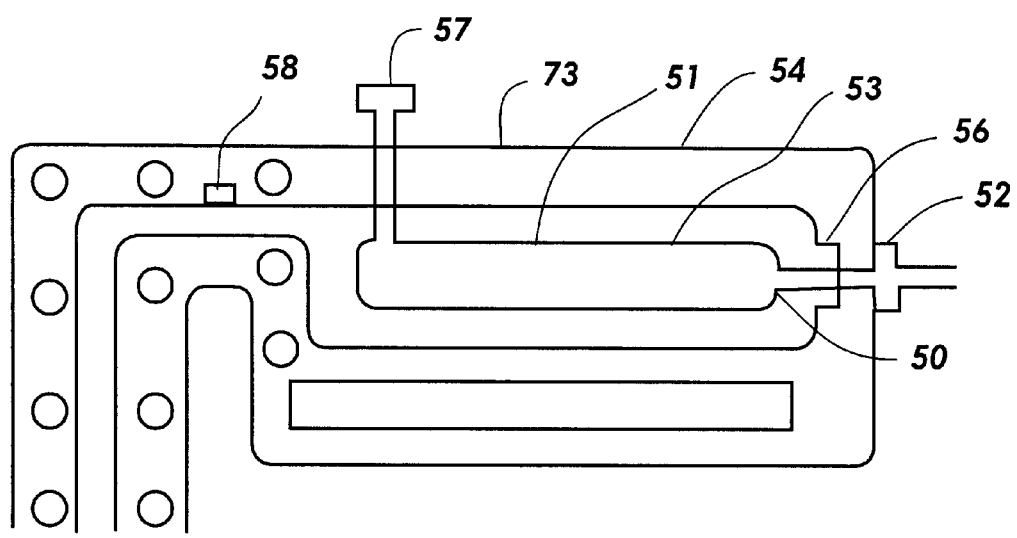
FIG. 6 is a cross-section of a steam generator of the present invention.

Referring also to FIG. 6, for embodiments of the present invention using steam to power the turbine, an embodiment of a steam generator system 73 which may be used is illustrated. Steam generators 50 have steam chambers 51 with controlled outputs. These outputs are controlled by a control valve 52, which are monitored and controlled by a steam control computer. For preferred embodiments the steam generators will be flash steam generators 54 as shown in FIG. 1 and FIG. 6. The flash chambers 53 for flash steam generators will be quite small in relation to the heat source, thereby providing for a quick recovery. A pressure sensor 56 is used by the steam control computer to monitor the steam pressure in the flash chamber. The control computer allows the pressure in the flash chamber to reach a desired pressure and maintains the pressure at that level. When the need for more steam is determined by the control computer, the control valve is opened for that flash chamber. If more steam is required, more control valves are opened, bringing more flash chambers on line. As the steam pressure in the flash chamber is depleted, the control computer determines that more water is required and increases the water flow.

The steam generators have several safety devices. One is an over pressure relief valve 57 and the other is a heat source high temperature shutoff sensor 58.

Other embodiments may incorporate a combination of flash generators and other types of steam generators. This can provide for a fixed amount of steam at a constant rate while leaving the flash generators for quick response to special power demands for the turbine.

Other embodiments may utilize only a fixed steam system. For these embodiments, the rotation speed or the amount of power that is delivered to the turbine is still controlled by a series of valves which are controlled by the control computer. This type of steam generator may be more readily adapted to an engine used to generate electric power for battery storage for use with an electric motor driven device.

Turbine balance sensors 59 on the turbine shaft provide data to the control computer for the determination of whether the turbine is in balance. If the turbine is determined by the control computer to be out of balance, the control computer uses a turbine balancing device 60 to balance the turbine. The turbine balancing device may consist of four motors on the turbine. The motors are used to move weights on the turbine. As the weights are moved, the balance sensors on the output shaft 62 indicate to the computer whether the turbine is coming into balance or moving further out of balance. Using this feed back mechanism, the control computer brings the turbine back into balance.

The control computer continually monitors and controls the operating parameters of the turbine engine through use of sensors, feed back controls, and output devices. Turbine speed, required torque, gas or steam pressure, turbine balance and direction of rotation of the turbine are some of the parameters that are monitored and controlled. The control computer also controls water levels, water temperature, and water flow for cooling in a steam system and air flow around the expansion chamber for pressurized gas. By controlling water flow, the control computer can maximize the efficiency of the engine.

Communications between sensors, output devices and the control computer can be by wire or wireless transmissions. Power to the control sensors on the turbine may be by rotating connections 61 on the turbine shaft.

Figure 7:
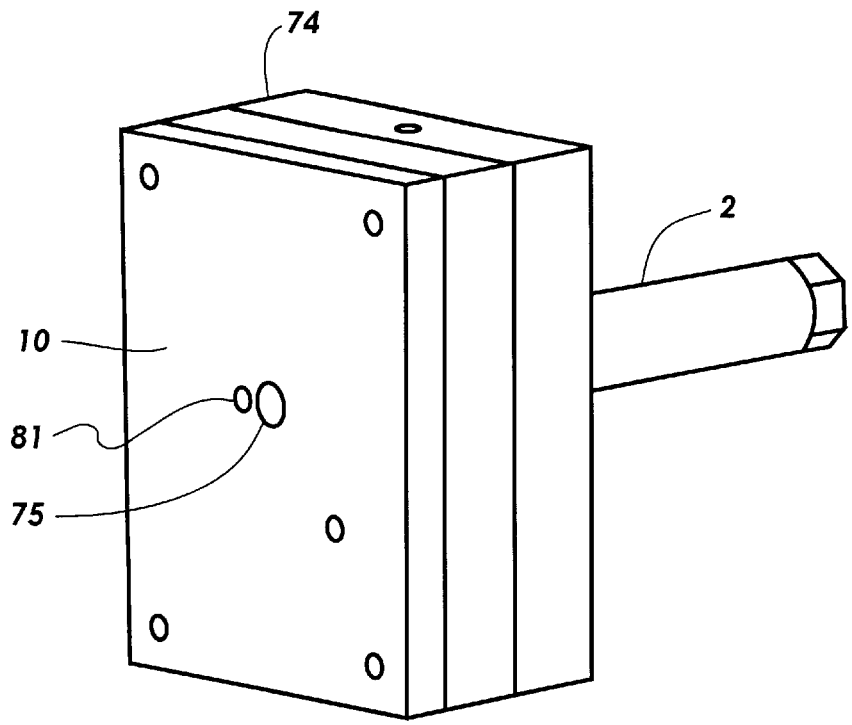
FIG. 7 is a side perspective view of an embodiment of a turbine engine of the present invention.

Referring now to FIG. 7, for other preferred embodiment of the pressurized gas turbine engine 74, steam or other pressurized gas may be supplied through the engine gas port 75 in the front wall 10 of the turbine engine.

Figure 8:
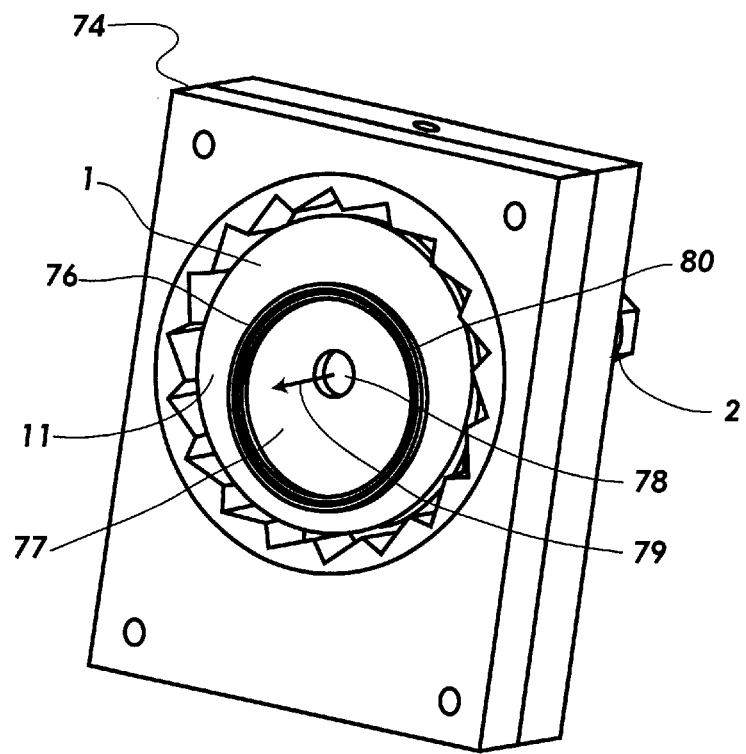
FIG. 8 is a front perspective view of an embodiment of a turbine engine of the present invention with the front wall of the turbine engine removed.
Figure 9:
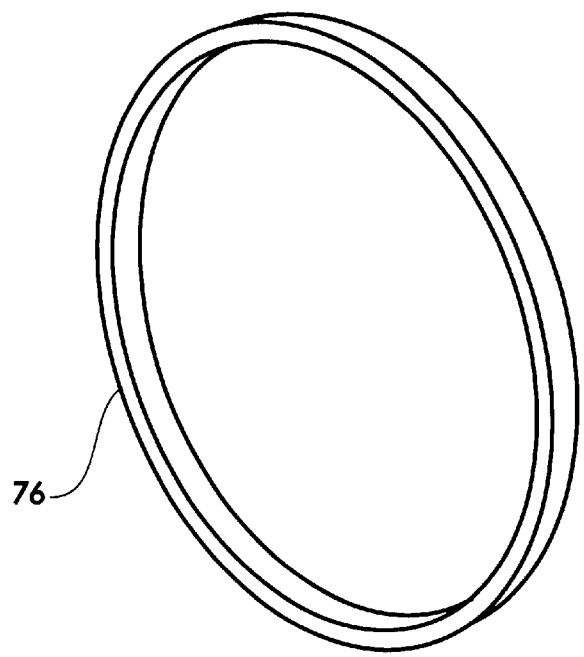
FIG. 9 is a front perspective view of an embodiment of a turbine seal ring of the present invention.

Referring now also to FIG. 8, a preferred embodiment of the turbine engine with the front wall of the turbine engine removed. For the preferred embodiment shown, the turbine shaft 2 connects to the rear of the turbine 1 and a seal ring 76 is affixed to the front face 11 of the turbine and provides a gas seal between the front face of the turbine and the front wall of the turbine engine, thereby creating a gas supply zone 77 between the front face of the turbine and the front wall of the turbine engine which is bounded by the gas seal. This provides for pressurized gas to be directed from the engine gas port to the turbine gas port 78. For some embodiments, such as that shown in the FIG. 8, the turbine seal ring is not centered on the axis of the turbine 79. This provides for the more uniform distribution of seal oil for all points of contact 80 between the turbine seal and the front wall of the turbine engine. The seal oil enhances the ability of the turbine seal to minimize pressurized gas leakage between the turbine seal and the front wall of the turbine engine. The seal oil is typically injected into the contact zone between the turbine seal and the turbine engine front wall through a seal oil injector port 81 in the front wall of the turbine engine as shown in FIG. 7. A detail of a typical turbine seal ring is shown in FIG. 9.

Figure 10:
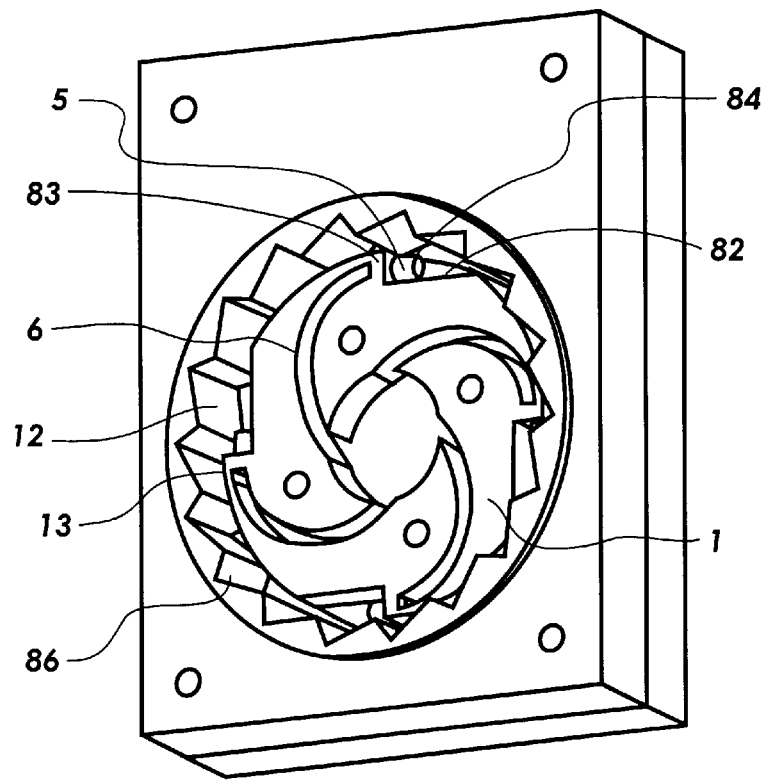
FIG. 10 is a front perspective view of an embodiment of a turbine engine of the present invention with the front wall of the turbine engine and the turbine front face removed, showing an embodiment of a turbine of the present invention and showing an embodiment of the turbine seat peripheral surface with transverse serrations.
Figure 11:
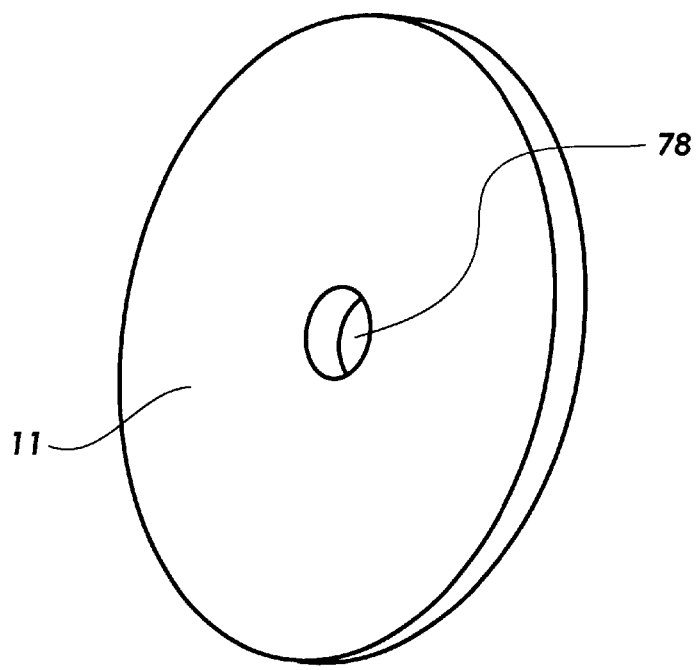
FIG. 11 is a front perspective view of an embodiment of a turbine front face of the present invention.

Referring now to FIG. 10, the turbine engine is shown with the front face of the turbine removed. A detail of a typical turbine front face for these embodiments is shown in FIG. 11.

Figure 12:
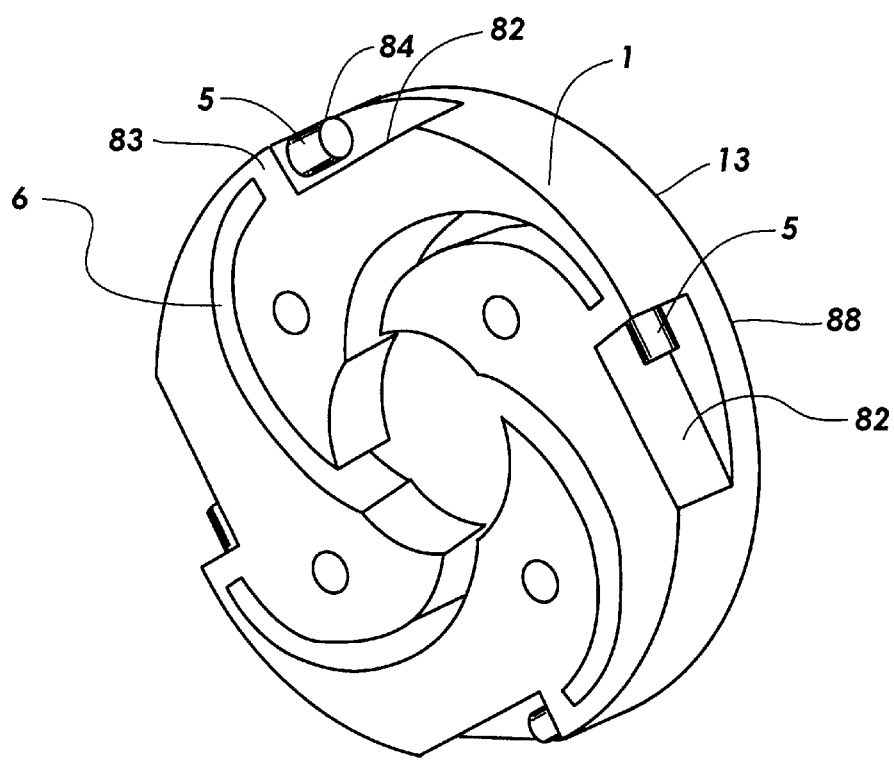
FIG. 12 is a front perspective view of an embodiment of a turbine of the present invention with the turbine front face removed.

For these embodiments, the pressurized gas which is supplied to the turbine flows into the turbine gas port from the gas supply zone as shown in FIG. 8, and is distributed down respective nozzle gas ways 6 to each of the turbine nozzles 5 as shown in FIG. 10. Referring also to FIG. 12, for the embodiment of the turbine shown in FIG. 10 and FIG. 12, the nozzle gas ways are cast, formed or machined in the turbine in the configuration shown. The nozzle gas ways are then sealed by the turbine front face as shown in FIG. 11.

For the embodiment of the turbine shown in FIG. 10 and FIG. 12, the nozzles are installed in a nozzle recess 82 in the turbine perimeter. The nozzles are typically screwed into a nozzle collar 83 thereby connecting each nozzle to the nozzle gas way. The nozzle recesses provide for the tip 84 of each of the nozzles to be inside the turbine perimeter 85, thereby providing for streamlining the turbine perimeter and allowing for a closer tolerance between the turbine perimeter and the turbine seat peripheral surface 12.

Referring to FIG. 10, preferred embodiments of the turbine engine may have a turbine seat peripheral surface 12 with transverse serrations 86 which increase the ground effect experienced by the turbine as pressurized gas is discharged through the nozzles.

Figure 13:
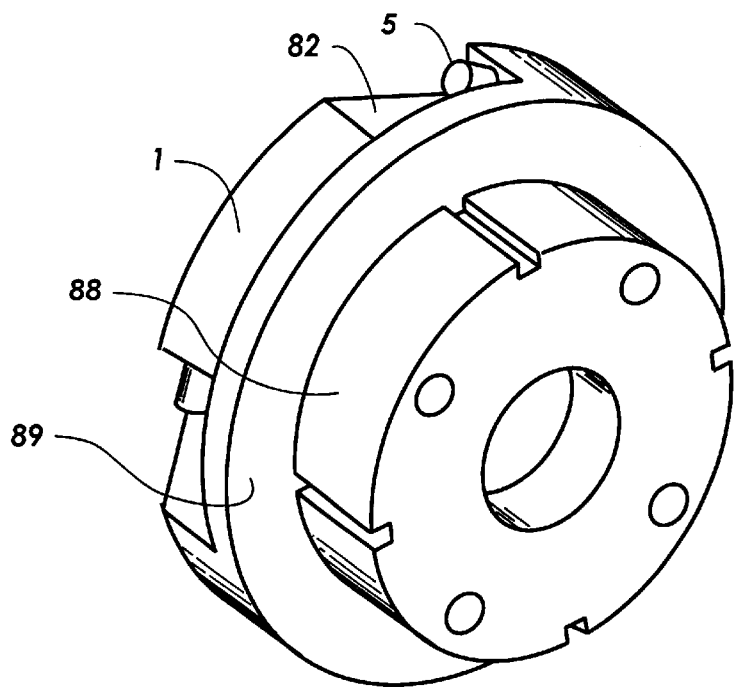
FIG. 13 is a rear perspective view of an embodiment of a turbine of the present invention with an integral evacuator spindle.
Figure 14:
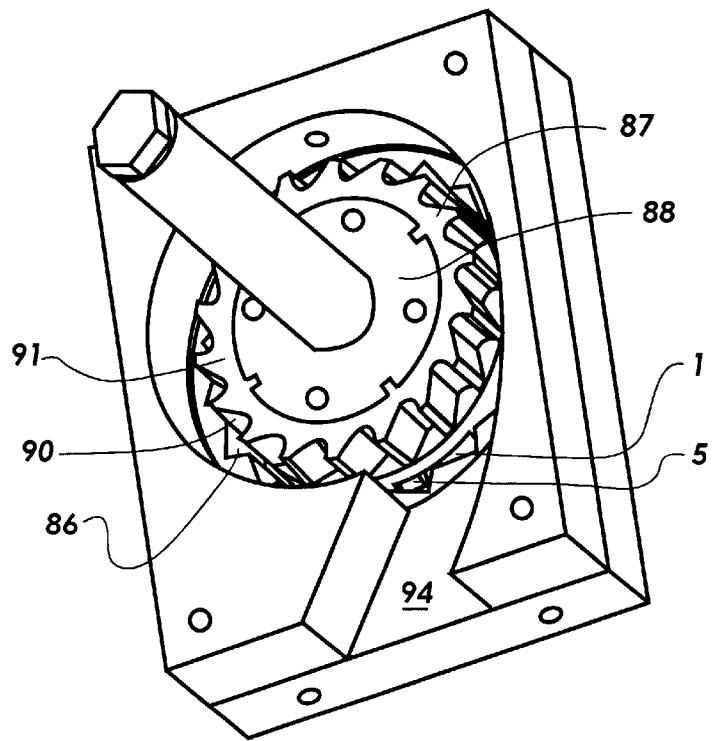
FIG. 14 is a rear perspective view of an embodiment of a turbine engine of the present invention with the evacuator cover plate removed, showing a spent gas evacuator attached to the evacuator spindle, evacuation channel and turbine seat peripheral surface transverse serrations.

For the embodiments of the turbine engine shown in FIGS. 7 and 8, a spent gas evacuator 87 may be attached to the turbine as shown in FIG. 14. Referring also to FIG. 13, for these embodiments, the turbine may have an evacuator spindle 88 extending from the rear face 89. The spent gas evacuator is anchored to the evacuator spindle as shown in FIG. 14.

Figure 15:
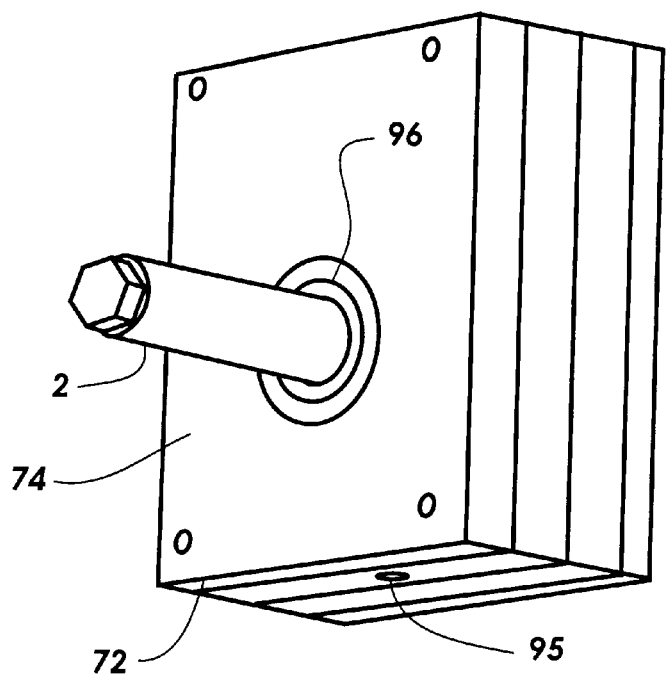
FIG. 15 is a rear perspective view of an embodiment of a turbine engine of the present invention.
Figure 16:
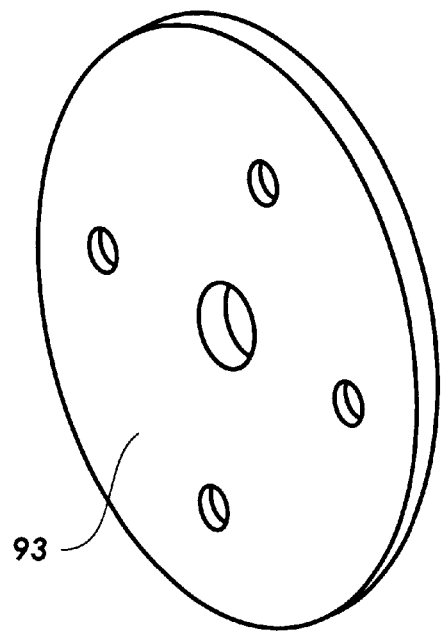
FIG. 16 is a rear perspective view of an embodiment of a evacuator cover plate of the present invention.

Referring again to FIG. 14, the transverse serrations 86 typically will extend also to the gas expansion area 90 of the turbine seat which is proximal to the perimeter of the spent gas evacuator. For these embodiments, the rear face 91 of the spent gas evacuator is proximal to the turbine engine rear wall 72 as shown in FIG. 15. FIG. 14 shows the pressurized gas turbine engine with the turbine engine rear wall and the spent gas evacuator cover plate 93 removed. A detail of the spent gas evacuator cover plate is shown in FIG. 16. Therefore, for these embodiments, the expansion chamber is occupied by the spent gas evacuator and the spent gas is directed to the spent gas evacuation channel 94 for discharge through the spent gas port 95 as shown in FIG. 15.

As shown in FIG. 1, the spent gas, seal oil and condensate are recycled.

For the embodiments shown in FIG. 15, the turbine shaft 2 is only supported by turbine shaft bearings 96 in the rear wall of the turbine engine. Energy output from the turbine engine is from the turbine shaft.

Figure 17:
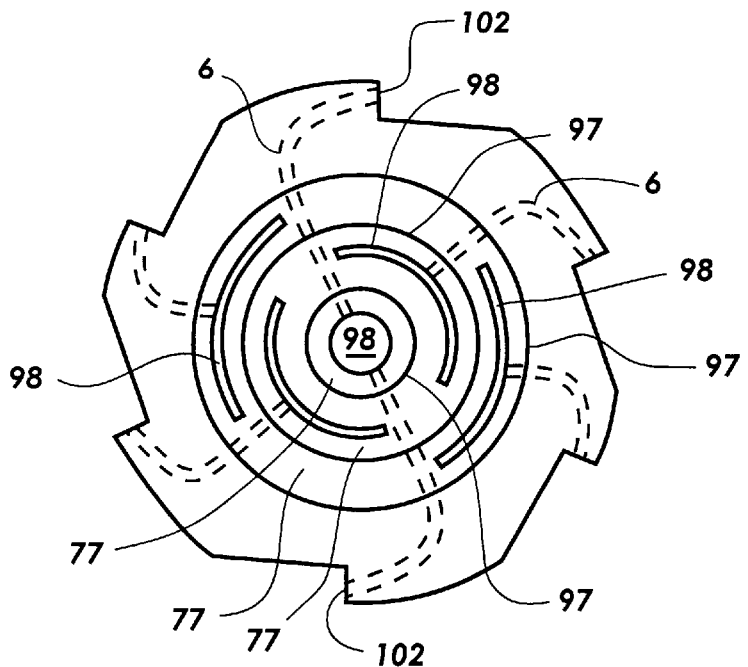
FIG. 17 is a front perspective view of an embodiment of a turbine engine of the present invention showing gas seal rings and gas supply zones, providing for keying independent pressurized gas sources to specific nozzles or coordinated groups of nozzles.

Referring now to FIG. 17, a nozzle or one or more opposing pairs or equally spaced groups of coordinated nozzles may be connected to separate pressurized gas sources through the use of multiple turbine gas seals 97 and turbine gas ports 98 which direct the pressurized gas received through respective engine gas ports in the front wall of the turbine engine and the respective gas supply zones 77 between the front face of the turbine and the front wall of the turbine engine, to respective nozzle gas ways 6 and thus to the respective nozzle or pairs or groups of coordinated nozzles 102.

Figure 18:
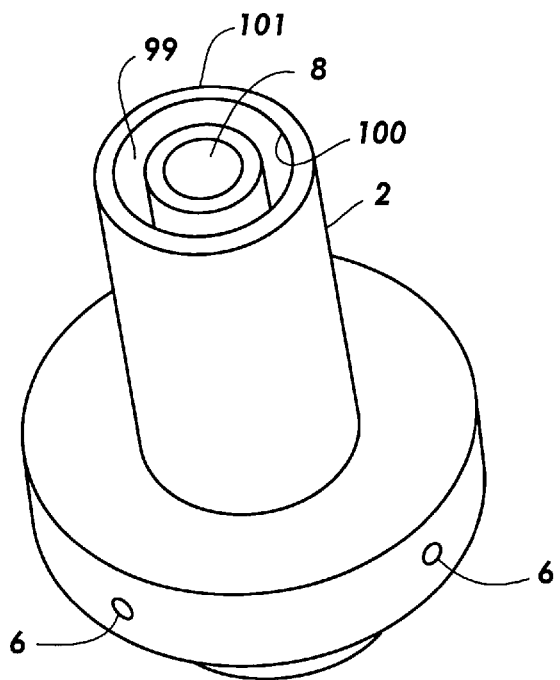
FIG. 18 is a perspective detail of an embodiment of a turbine shaft of the present invention with two internal shaft gas way, providing for utilization of two pressurized gas sources.
Figure 19:
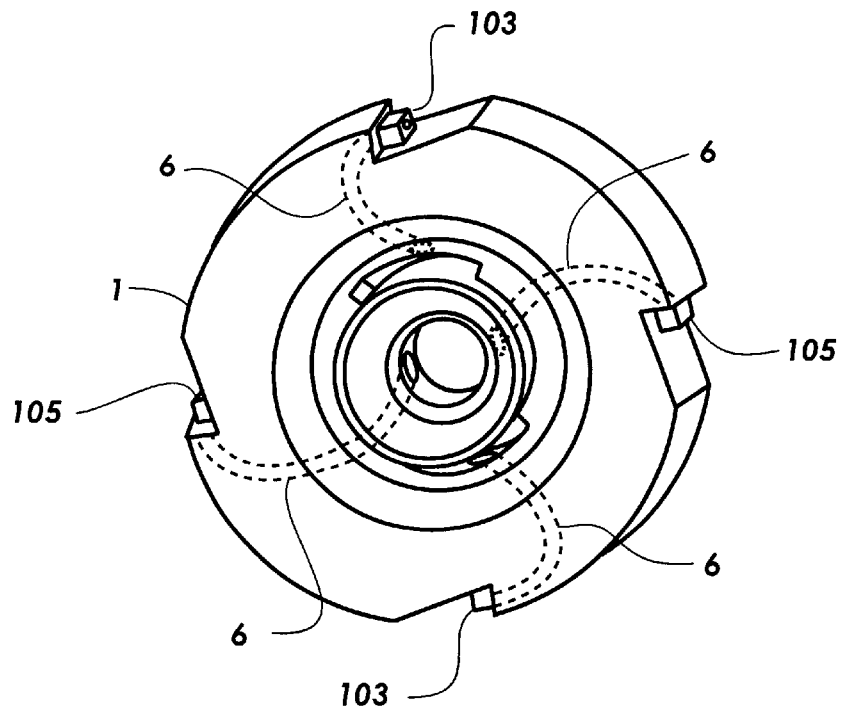
FIG. 19 is a front view perspective detail of an embodiment of a turbine of the present invention for use with a turbine shaft with two internal shaft gas way, providing for utilization of two pressurized gas sources.

Another embodiment which provides for two separate gas sources to be utilized with pairs or groups of coordinated nozzles is shown in FIG. 18 and FIG. 19. This embodiment utilizes a central internal shaft gas way 8 to transmit gas from one pressurized gas source through interconnected nozzle gas ways 6 to a first group of coordinated nozzles 105, and utilizes the annular space 99 between the central shaft gas way and the inside surface 100 of the shaft tube 101 of the turbine shaft 2 as a second shaft gas way to transmit gas from a second pressurized gas source through other interconnected nozzle gas ways 6 to a second group of coordinated nozzles 103.

Figure 20:
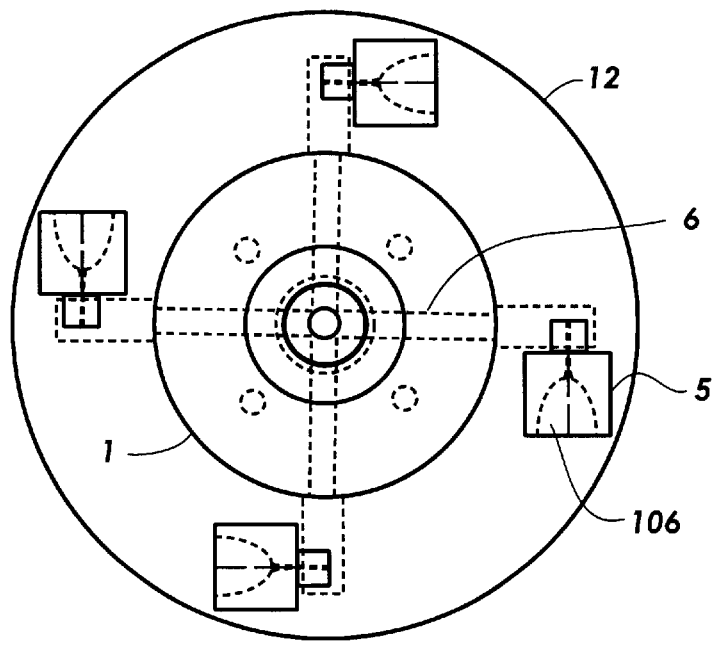
FIG. 20 is a front view of an embodiment of a turbine engine of the present invention with the front wall removed, the turbine having gas nozzles with gas exit cones affixed to the perimeter of the turbine by nozzle support tubes.
Figure 21:
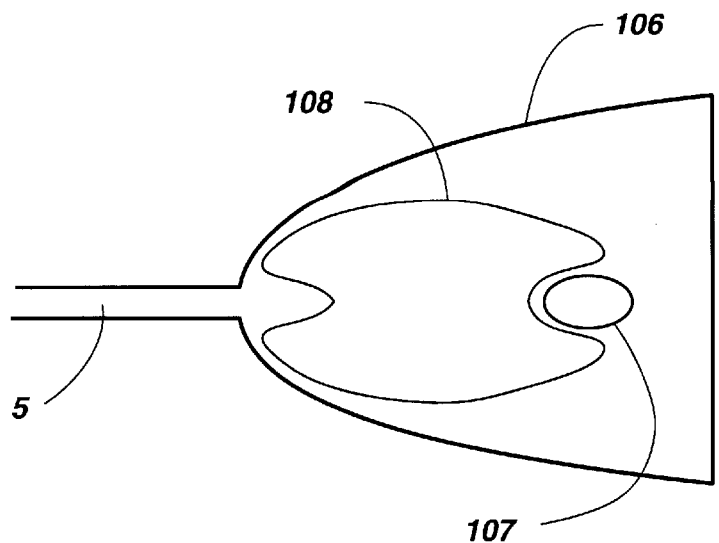
FIG. 21 is a longitudinal cross section of a pressurized gas nozzle, gas exit cone and gas plume of a gas nozzle of the present invention.
Figure 24:
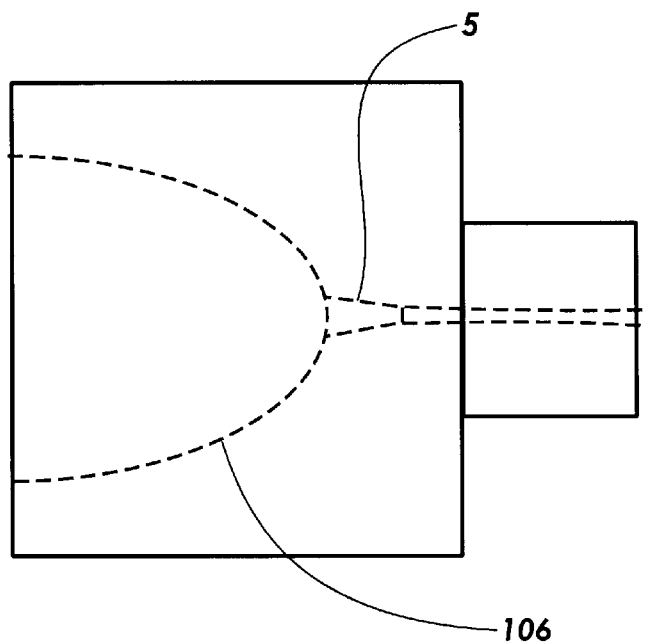
FIG. 24 is a cross-section detail of an embodiment of a gas nozzle of the present invention with a gas exit cone.

Referring now to FIG. 20, a preferred embodiment of the pressurized gas turbine engine of the present invention which utilizes a pressurized gas turbine 1 having gas nozzles 5 with gas exit cones 106. A detail of a typical gas nozzle and gas exit cone are shown in FIG. 24. The utilization of the gas exit cones with the gas nozzle is to improve the efficiency of the nozzles and to take advantage of the additional thrust generated by nozzle exit cones as a result of the formation of a compression or eddy zone 107 in the tip of the plume 108 as shown in FIG. 21. The inventor has found that gas exit cones with dimensions which are proportionally similar to the dimensions of a typical rocket engine exhaust cone work well for certain embodiments of the present invention.

Figure 22:
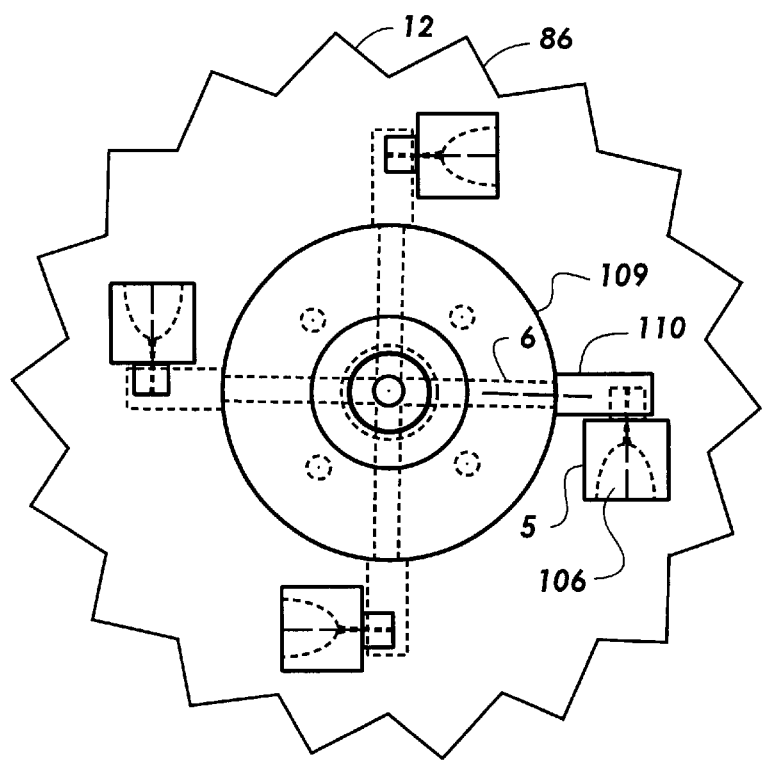
FIG. 22 is a front view of an embodiment of the turbine engine of the present invention with the front wall removed, the turbine having gas nozzles with gas exit cones affixed to the perimeter of the turbine by nozzle support tubes, and the turbine seat peripheral surface having transverse serrations.

As shown for preferred embodiments described above, the turbine seat peripheral surface 12 can be circular and uniform as shown in FIG. 20 or can have transverse serrations 86 as shown in FIG. 22. The gas nozzles and nozzle exit cones can be supported beyond the perimeter of the turbine central disk 109 by nozzle support tubes 110 as shown in FIGS. 20 and 22 or can be machined, formed or cast into the perimeter of the turbine 13 as shown in FIG. 23.

Figure 23:
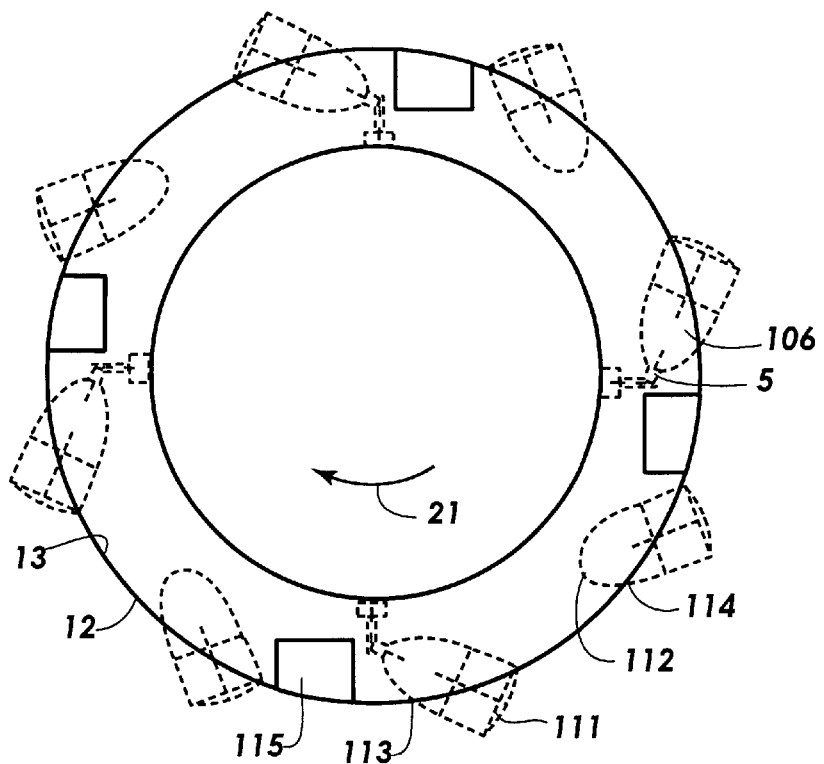
FIG. 23 is a front view of an embodiment of the turbine engine of the present invention with the front wall removed, the turbine having gas nozzles with gas exit cones, back flow receiving chambers, and depletion chambers recessed in the perimeter of the turbine, and the turbine seat peripheral surface having recessed gas receiving chambers.

Referring to FIG. 23, for this embodiment there is a close tolerance between the turbine perimeter and the turbine seat peripheral surface 12. For this embodiment with the gas nozzles and gas exit cones in the position shown, pressurized gas from each nozzle pressurizes the gas exit cone in the turbine perimeter and the pressurized gas receiving chamber 111 in the turbine seat peripheral surface. The flow of pressurized gas from a nozzle to the gas exit cone and into the gas receiving chamber, propels the turbine causing it to rotate in the desired direction 21. As the turbine rotates, each gas receiving chamber that has been pressurized subsequently aligns with a back flow receiving chamber 112 in the turbine perimeter, thereby causing pressurized gas to be transferred from the receiving chamber to the turbine back flow receiving chamber, thereby imparting additional thrust on the turbine. Therefore, each gas receiving chamber is used for consecutive cycles of pressurization, with pressurized gas flowing from the nozzle and gas exit cones into the gas receiving chamber when the gas nozzle, the gas exit cone and the gas receiving chamber are in a pressurization position 113, and de-pressurization with gas flowing from the gas receiving chamber into the back flow receiving chamber when the back flow receiving chamber and the gas receiving chamber are in a de-pressurization position 114. Depletion of the remaining pressure in the gas receiving chamber and the back flow receiving chamber, is accomplished by the depletion chamber 115 as the turbine rotates and the depletion chamber becomes hydraulically connected to the pressurized gas receiving chamber prior to the back flow receiving chamber being hydraulically disconnected from the gas receiving chamber. The dissipation chamber may be hydraulically connected to a spent gas receiving and processing system, particularly in the case of steam driven turbine, so that moisture and heat can be reclaimed and recycled and oil can be removed.

Simplified embodiments of the turbine of the present invention may utilize a single nozzle gas way or interconnected nozzle gas ways to provide pressurized gas to all of the nozzles. For the simplest of these embodiments, a single nozzle gas way will comprise a single chamber in the turbine which is connected to all the nozzles. A hollow turbine would be one version of this simplified embodiment of the turbine. A hollow turbine with dividers to form nozzle gas ways would constitute a simplified embodiment with two or more nozzle gas ways.

The present invention can also be used with simplified, high efficiency generator systems by providing for the direct flashing of hot water to steam in the nozzles. This has use for a number of applications such a geothermal wells which usually rely on superheated water extracted from the wells. The high energy losses which occur as hot water is flashed to steam and the steam is then used to power the turbine are substantially reduced through the direct flashing of superheated water as it is passed through the gas nozzles of the present invention.

Other embodiments of the invention and other variations and modifications of the embodiments described above will be obvious to a person skilled in the art. Therefore, the foregoing is intended to be merely illustrative of the invention and the invention is limited only by the following claims.

What is claimed is:

1. Pressurized gas turbine engine comprising:
   a) a turbine having a plurality of gas nozzles, one or more nozzle gas ways, one or more turbine gas intakes, and a turbine shaft, each gas nozzle being affixed to the perimeter of the turbine in a respective nozzle position and hydraulically connected to one or more nozzle gas ways by a nozzle support tube, each gas nozzle comprising a gas exit cone, the axis of each of the gas nozzles forming an oblique angle with the direction of rotation of the perimeter of the turbine at the respective nozzle position, and each turbine gas intake being hydraulically connected to at least one gas nozzle by a nozzle gas way; and
   b) a turbine engine body enclosing the turbine in a turbine chamber, the turbine engine body having a front wall and a rear wall, the front wall having one or more engine gas ports, and the rear wall having a shaftway passing the turbine shaft.

2. Pressurized gas turbine engine comprising:
   a) a turbine having a plurality of gas nozzles, one or more nozzle gas ways, one or more turbine gas intakes, and a turbine shaft, each gas nozzle being affixed at the perimeter of the turbine in a respective nozzle position, the axis of each of the gas nozzles forming an oblique angle with the direction of rotation of the perimeter of the turbine at the respective nozzle position, each nozzle gas way being hydraulically connected to one or more gas nozzles and each turbine gas intake being hydraulically connected to at least one nozzle by a nozzle gas way;

b) a turbine engine body enclosing the turbine in a turbine chamber, the turbine engine body having a front wall and a rear wall, the front wall having one or more engine gas ports, and the rear wall having a shaftway passing the turbine shaft; and c) two or more gas seal rings of differing diameters affixed to the front face of the turbine sealing between the front face of the turbine and the front wall of the turbine engine and creating two or more gas supply zones between the front face of the turbine and the front wall of the turbine engine, each engine gas port being hydraulically connected to a gas supply zone and each engine gas port being hydraulically connectable to one or more pressurized gas sources, and wherein the front face of the turbine has two or more turbine gas ports, one or more of the respective turbine gas ports being hydraulically connected to each gas supply zone and each respective turbine gas port being hydraulically connected to selected nozzle gas ways.

3. Pressurized gas turbine engine as recited in claim 2 further comprising a plurality of controllable pressurized gas sources, each of the engine gas ports being hydraulically connected to one or more of the respective pressurized gas sources, thereby providing for a variation in the number of nozzles which are pressurized and providing for a variation in the pressure of the gas delivered to each nozzle.

4. Pressurized gas turbine engine comprising:

a) a turbine having a plurality of gas nozzles, one or more nozzle gas ways, one or more turbine gas intakes, and a turbine shaft, each gas nozzle being affixed at the perimeter of the turbine in a respective nozzle position, the axis of each of the gas nozzles forming an oblique angle with the direction of rotation of the perimeter of the turbine at the respective nozzle position, each nozzle gas way being hydraulically connected to one or more gas nozzles and each turbine gas intake being hydraulically connected to at least one nozzle by a nozzle gas way;

b) a turbine engine body enclosing the turbine in a turbine chamber, the turbine engine body having a front wall and a rear wall, the front wall having one or more engine gas ports, and the rear wall having a shaftway passing the turbine shaft; and c) two or more gas seal rings of differing diameters affixed to the inside surface of the front wall of the turbine body, sealing between the front face of the turbine and the front wall of the turbine engine and creating two or more gas supply zones between the front face of the turbine and the front wall of the turbine engine, each engine gas port being hydraulically connected to a gas supply zone and each engine gas port being hydraulically connectable to one or more pressurized gas sources, and wherein the front face of the turbine has two or more turbine gas ports, one or more of the respective turbine gas ports being hydraulically connected to each gas supply zone and each respective turbine gas port being hydraulically connected to selected nozzle gas ways.

5. Pressurized gas turbine engine as recited in claim 4 further comprising a plurality of controllable pressurized gas sources, each of the engine gas ports being hydraulically connected to one or more of the respective pressurized gas sources, thereby providing for a variation in the number of nozzles which are pressurized and providing for a variation in the pressure of the gas delivered to each nozzle.

* * * * *